G. DUNHAM.
METHOD OF MAKING NUTS.
APPLICATION FILED MAR. 6, 1908.
928,508.
Patented July 20, 1909.
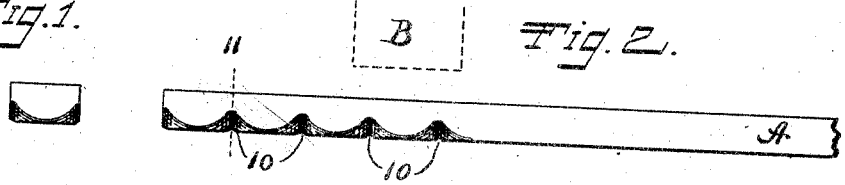
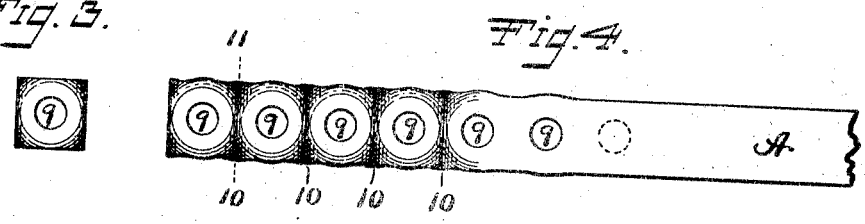
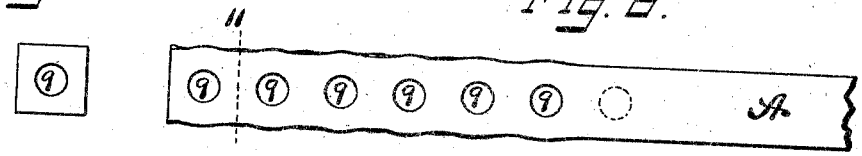
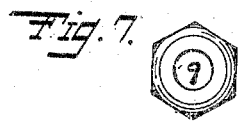
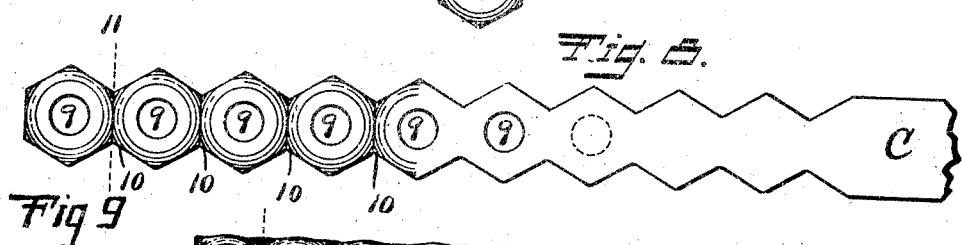
Witnesses.
S. H. Clarke
W. J. Kibbe
Inventor.
George Dunham
By James Shepard
Atty.

UNITED STATES PATENT OFFICE.

GEORGE DUNHAM, OF UNIONVILLE, CONNECTICUT.

METHOD OF MAKING NUTS.

No. 928,508.  Specification of Letters Patent.  Patented July 20, 1909.

Application filed March 6, 1908. Serial No. 419,590.

*To all whom it may concern:*

Be it known that I, GEORGE DUNHAM, a citizen of the United States, residing at Unionville, in the county of Hartford and State of Connecticut, have invented certain new and useful Improvements in Methods of Making Nuts, of which the following is a specification.

My invention relates to the method of making nuts for bolts from a flat bar of metal by means of dies and punches, and the object of my improvement is economy of production by facilitating the manufacture and avoiding one transferring operation.

In the accompanying drawings:—Figure 1 is an edge view of a rectangular nut as severed from the end of the bar shown in Fig. 2, the said nut illustrating the result of the third step in my method of making nuts. Fig. 2 is an edge view of a bar of metal illustrating the three steps of my method of making nuts from such bar. Figs. 3 and 4, are reverse plan views of the nut and bar shown in Figs. 1 and 2 respectively. Figs. 5 and 6, are plan views of the nut and bar shown in Figs. 1 and 2, and 3 and 4, respectively. Fig. 7 is a reverse plan view of a hexagonal nut as severed from the end of the bar Fig. 8, and Fig. 8 is a reverse plan view of a bar of metal illustrating my method of making nuts from a flat bar of metal in the production of hexagonal nuts, and in which the same three steps employed in the production of rectangular nuts are illustrated as preceded by a preliminary step. Fig. 9 is a view corresponding to Fig. 4, but in a slightly modified form.

My method is particularly applicable to making nuts from a bar of metal by means of a gang of dies and punches which form the round hole in the nut blanks, crown or around the under side, and then sever the nut from the bar by a die and punch that not only cuts off the nut, but at the same time trims off the surplus metal on all sides. By my improvement the nut may be crowned in the bar after the central hole has been punched by a simple feed of the bar and without any carrier or transferring device whereby an automatic machine for making nuts may be very much simplified.

A, designates a flat bar of metal that is about as wide as the width of the nut to be produced. It may be a trifle narrower if desired, because the punching and swaging operations tend to widen the bar. This widening of the bar before severing the nut blanks is one of the advantages due to my improvement. The ordinary round holes 9 are one by one punched centrally with reference to each intended nut blank. The punching of these nut blanks is the first step in the process. The bar with a number of holes punched in it is then fed along over a swaging or crowning die and under a suitable flat faced punch or hammer, which hammer is indicated by broken lines at B, in Fig. 2. The swaging die is preferably recessed to fit the crowned face of one nut and also to fit the face of half of one nut on that side of the die toward which the bar is fed. It may also cover half of the crowned face of a nut on its other side. The hammer B, when one and a half blanks are operated upon at one stroke, should be wider, (measured in the direction of the length of the bar,) than the width of one nut, so as to cover nearly the length of the bar between two adjacent round holes 9. The bar is fed at each feed a distance equal to the width of one nut blank so that as the hammer descends and forces the bar upon the crowning die a peculiar shaped transverse groove 10 is formed in between two nut blanks and one half of each of said nut blanks is crowned. After one such groove 10 is formed, thereby crowning half of two blanks, the bar is fed along and the next swaging or crowning operation will crown half of two more blanks while the crowning die will again operate upon that one of the blanks which was half crowned before, and not only crown the other half of the same blank but act against the entire face of the nut to perfect and smooth its whole face in case any perfecting is necessary. Crowning the blanks is the second step in the process. The bar with a plurality of punched and crowned nut blanks is fed to an ordinary trimming punch and die that cut off the end nut blank to sever it from the bar, and at the same time pass the blank through the die to trim off any surplus metal. The punch for the crowning die, and that for the severing or trimming die may either or both carry an ordinary pilot or center, to bring the respective blanks into the proper position over the several dies. This is one of the advantages of punching the round hole before crowning the nut blank.

I have called Figs. 5 and 6, plan views because the bar would be in the position shown in Fig. 6 if the dies and punches were in a press or machine having a vertically moving slide. The bar would be run through the machine with the flat side at the top. The words top and bottom are used relatively to such a machine. Whichever side up the bar may be when operated upon I prefer that the swaging or crowning die shall be opposite a hammer which moves to force the bar into the die.

The number of blanks that are formed upon the bar before cutting off will depend upon the spacing of the dies and punches. In the preferred operation the bar is fed from the right toward the left and the dies are spaced for forming the nut blank on the bar as shown. The first operation is to punch one hole 9 in a nut blank on the bar. The punch for so doing is located where the round hole is indicated by a broken circle. The bar with the hole so punched is fed along the width of one blank and the hole for the second blank punched. At the next feed in addition to punching another hole the forward half of the nut blank at the end of the bar will be crowned. At the next three feeds three more blanks will be crowned leaving the bar in the form shown up to the transverse broken line 11, Figs. 2, 4 and 6. At the next feed and the seventh blow of the press from the start, the end nut on the bar will be severed on the line 11 and trimmed on its other three sides, and at the same time another nut blank, (or two half blanks,) will be crowned and another hole punched as indicated by the broken circle in Figs. 2, 4 and 6, resulting in the trimmed nut blank Figs. 1, 3 and 5.

While I prefer to make the crowning die wide enough to cover one nut blank and a half of a nut blank, (either on one or both sides thereof,) it is not necessary to do so, as a die may be used which covers but little if any more than the face of a single nut blank. A series of connected nut blanks crowned with such a die is illustrated in Fig. 9, in which $A^1$, designates the bar and $10^a$ the first groove that is formed in the bar by the crowning die. In this groove the adjacent uncrowned nut blank, instead of being half crowned as before is only beveled a little on that edge which is adjacent to the groove $10^a$ in Fig. 9. When such a die is used the foregoing description of the operation should be modified accordingly, that is to say, the crowning die acts to crown only one blank, instead of one half of two blanks.

Heretofore, small nuts have been crowned in the bar by feeding the bar through roller dies, to the die and punch for punching the round hole therein after the blanks were crowned. It was very difficult to punch these blanks so as to form the holes concentric to the crowned faces. Ordinarily nut blanks are not crowned until after they have been severed from the bar. By my method of first punching the blanks in the bar, then crowning, and then cutting off, I am enabled to make the crowned faces and punchings concentric and I also save feeding a cut off and crowned nut to the trimming dies.

I claim as my invention:—

1. The herein described method of making nuts, which consists in punching a round hole in the nut blanks at one end of a flat bar of metal, then swaging one side of the said bar to crown the faces of the said punched blanks, and then severing a punched and crowned nut blank from the said bar.

2. The herein described method of making nuts which consists in punching a round hole in the nut blanks at one end of a flat bar of metal, then swaging one side of the said bar to crown the faces of the said punched blanks, and then severing a cr ned nut blank from the end of the said b  and at the same operation trimming the s plus metal from the side edges of the said blank.

GEORGE DUNHAM.

Witnesses:
G. A. MERRIMAN,
M. C. FOSTER.